(12) United States Patent  
Beyabani

(10) Patent No.: US 9,113,210 B2  
(45) Date of Patent: *Aug. 18, 2015

(54) METHODS AND SYSTEMS FOR PROVIDING DEMAND BASED SERVICES

(71) Applicant: Verizon Patent and Licensing Inc., Arlington, VA (US)

(72) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,785

(22) Filed: Jun. 19, 2014

(65) Prior Publication Data

US 2014/0304727 A1     Oct. 9, 2014

Related U.S. Application Data

(63) Continuation of application No. 11/860,181, filed on Sep. 24, 2007, now Pat. No. 8,789,079.

(51) Int. Cl.
*H04H 60/33* (2008.01)
*H04N 21/466* (2011.01)
*H04N 7/173* (2011.01)
*H04N 21/258* (2011.01)
*H04N 21/442* (2011.01)
*H04N 21/472* (2011.01)
*H04N 21/658* (2011.01)
*H04N 21/8352* (2011.01)

(52) U.S. Cl.
CPC ....... *H04N 21/4667* (2013.01); *H04N 7/17318* (2013.01); *H04N 21/25891* (2013.01); *H04N 21/44222* (2013.01); *H04N 21/47202* (2013.01); *H04N 21/6582* (2013.01); *H04N 21/8352* (2013.01)

(58) Field of Classification Search
USPC .............................. 725/9, 14, 44–47, 86–103
See application file for complete search history.

(56) References Cited

U.S. PATENT DOCUMENTS

| | | |
|---|---|---|
| 2003/0051250 A1 | 3/2003 | Sugimoto et al. |
| 2006/0271958 A1 | 11/2006 | Ukai et al. |
| 2007/0100709 A1 | 5/2007 | Lee et al. |
| 2007/0180465 A1 | 8/2007 | Ou et al. |
| 2007/0283409 A1 | 12/2007 | Golden |
| 2007/0288962 A1 | 12/2007 | Carlson et al. |
| 2008/0155613 A1 | 6/2008 | Benya et al. |

*Primary Examiner* — Nicholas Corbo

(57) ABSTRACT

A system and method may include monitoring content being displayed at a display device to generate monitoring data that includes a program identifier, communicating the monitoring data to a server, the server determining which programs to include in an on-demand lineup based on the monitoring data and generating an on-demand lineup message to identify on-demand programs included in the on-demand lineup, and receiving the on-demand lineup message from the server.

21 Claims, 8 Drawing Sheets

METHODS AND SYSTEMS FOR PROVIDING DEMAND BASED SERVICES

CROSS REFERENCE TO RELATED APPLICATION

The subject application is a Continuation application of U.S. application Ser. No. 11/860,181, filed Sep. 24, 2007, which is hereby incorporated by reference in its entirety.

BACKGROUND INFORMATION

Television networks and advertisers have much interest in identifying which viewers are watching particular television programs. Conventionally, ratings groups have television viewers complete detailed surveys to gather information about what television programs the viewers are watching. The ratings groups then calculate a rating for each of the television programs based on the number of viewers watching a particular program. Ratings surveys, however, may not accurately reflect what programs are being watched by viewers at least due to a limited sample size, errors in viewers completing the surveys, or viewers filling out the surveys based on their favorite programs, as opposed to programs they actually watch.

These and other problems exist with conventional systems.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include monitoring content being displayed at a display device to generate monitoring data that includes a program identifier, communicating the monitoring data to a server, the server determining which programs to include in an on-demand lineup based on the monitoring data and generating an on-demand lineup message to identify on-demand programs included in the on-demand lineup, and receiving the on-demand lineup message from the server.

The description below describes servers, set top boxes, display devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, set top boxes, display devices, and network elements, etc.) separately. The functions described as being performed at various components may be performed at other components, and the various components may be combined and/or separated. Other modifications also may be made.

Figure 1:
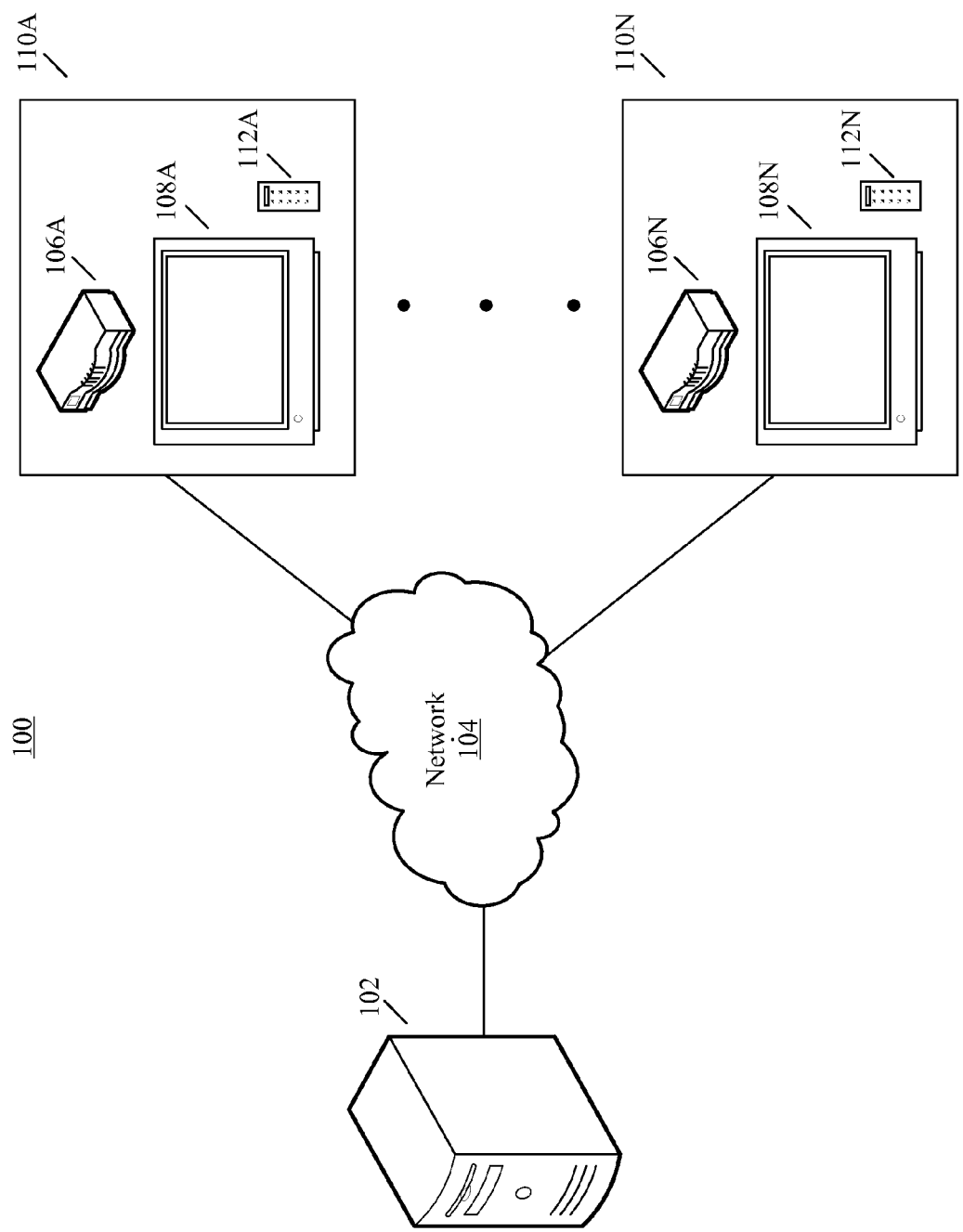
FIG. 1 illustrates a system in accordance with exemplary embodiments.

FIG. 1 illustrates a system in accordance with exemplary embodiments. The system 100 may perform demand based monitoring of programs and television channels being viewed by a group of viewers to monitor the popularity of these programs and television channels. The system 100 may use the monitored information to determine which programs to offer on-demand, to identify which channels to bundle together in different television channel packages to offer for sale to the viewers, and to identify which channels to offer for sale individually (e.g., a la carte).

In exemplary embodiments, the system 100 may include a server 102 communicatively coupled to a network 104, and one or more set top boxes 106 at one or more user premises 110 communicatively coupled to the network 104. The network 104 may communicate content signals from the server 102 to the set top boxes 106. The server 102 may communicate the content signal to the set top box 106 via the network 104 individually or to the set top boxes 106 as a group. In an exemplary embodiment, the server 102 may broadcast, multicast, and/or unicast the content signal.

The content signals may be, for example, television signals and/or audio signals that may be in digital or analog form, data, requests, other digital and/or analog information, and/or combinations thereof. The content signal also may include a plurality of channels, where the set top box 106 may tune to a particular channel to display the video of the channel at a display device 108, as is well known in television systems, where the viewer may use a user input device 112 (e.g., remote control, computer keyboard, computer mouse, etc.) to control of which channel the set top box 106 causes display at the display device 108. The content signal may be used to display content at the display device 108. Content may be video, audio, text, or other types of visually or audibly displayable information. It is noted that the input device 112 may be integrated in either the set top box 106, the display device 108, or both.

In an exemplary embodiment, the content signal may be a cable television signal complying with the American National Standard Society of Cable Telecommunication Engineers standard ANSI/SCTE 07 2006 titled "Digital Transmission Standard for Cable Television," the contents of which are incorporated herein by reference in its entirety. The content signal also may comply with other standards and may be communicated by the network 104.

The network 104 may be a wired network, a wireless network, and/or combinations thereof. The network 104 may transport the content signal and/or various messages in analog and/or digital form from the server 102 to the set top boxes 106. The network 104 also may transport analog and/or digital messages from the set top boxes 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the set top boxes 106 using three separate wavelengths, where one of the wavelengths may exchange data using a data communication session, such as, but not limited to, Internet Protocol, another wavelength may communicate content signals to the set top boxes 106, and the last wavelength may receive messages from the set top boxes 106. The network 104 also may be a cable television network, a satellite network, combinations thereof, or other networks capable of distributing a content signal from the server 102 to the set top boxes 106, and exchanging information, messages, requests, etc., between the server 102 and the set top boxes 106 via the network 104.

The user premises 110A-N may each include a set top box 106 and a display device 108. FIG. 1 illustrates a set top box 106A and a display device 108A at user premises 110A, and a set top box 106 and a display device 108 at user premises 110N. It is also noted that a single user premises 110 may include multiple set top boxes 106 and multiple display devices 108. The set top box 106 also may be remotely located from the display device 108.

In an exemplary embodiment, the set top box 106 may be a hardware device that may receive a content signal from the network 104, may cause display of the content signal at the display device 108, and may communicate messages to the network 104. For example, the set top box 106 may cause display of a cable television signal at the display device 108, which may be, for example, a television set. In another example, the set top box 106 may be a computer and the display device 108 may be a computer monitor. It is noted that the set top box 106 and the display device 108 are depicted and described as being separate devices in FIG. 1. The set top box 106 and the display device 108, however, may be combined into a single unit. The functions performed by the set top box 106 and the display device 108 also may implemented in a mobile phone, a wireless device, or any other device that may communicate via the network 104.

It is noted that system 100 illustrates a simplified view of various components included in a content distribution system, and that other hardware devices and software not depicted may be included in the system 100. It is also noted that the system 100 illustrates only a single server 102 and a single network 104. It will be appreciated that multiple instances of these devices may be used. The set top box 106 is discussed in further detail below.

Figure 2:
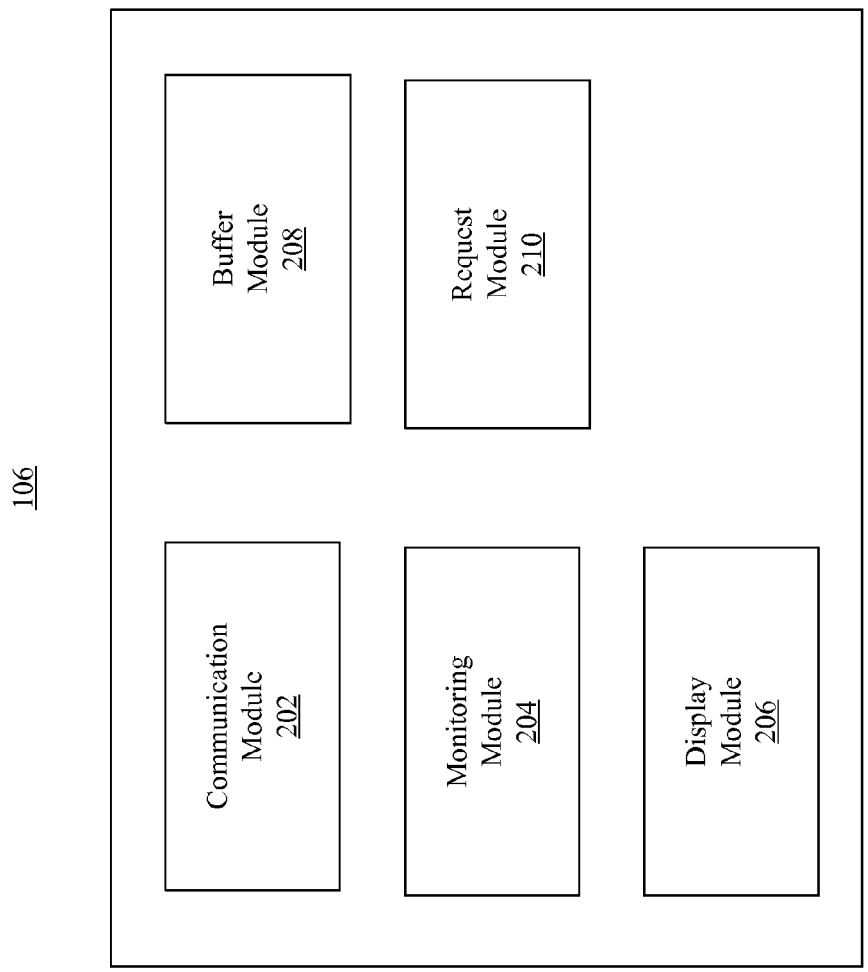
FIG. 2 illustrates exemplary modules of a set top box in accordance with exemplary embodiments.

FIG. 2 illustrates exemplary modules of a set top box in accordance with exemplary embodiments. The set top box 106 may receive the content signal from the server 102 via the network 104, may cause display of the content signal at the display device 108, and may communicate various messages with the server 102 via the network 104.

In an exemplary embodiment, the set top box 106 may include a communication module 202, a monitoring module 204, a display module 206, a buffer module 208, and a request module 210. It is noted that the modules 202, 204, 206, 208, and 210 are exemplary. The functions of the modules 202, 204, 206, 208, and 210 may be performed by other modules remote or local to the set top box 106, and the modules 202, 204, 206, 208, and 210 may be combined and/or separated.

The communication module 202 may provide communication between the set top box 106 and the network 104. The communication module 202 may forward the content signal and/or messages received from the network 104 to the other modules 204, 206, 208, and 210, and may communicate messages received from the modules 204, 206, 208, and 210 to the network 104.

The monitoring module 204 may monitor what programs and/or channels the set top box 106 is causing the display device 108 to display. Each program may include a program identifier that uniquely identifies a particular program from other programs. The program identifier may be a number sequence, a letter sequence, a symbol sequence, combinations thereof, and/or other information to uniquely identify the program. Each channel may include a channel identifier that uniquely identifies a particular channel from other channels. The channel identifier may be a number sequence, a letter sequence, a symbol sequence, combinations thereof, and/or other information to uniquely identify the channel.

When the viewer uses the input device 112 to instruct the set top box 106 to cause display of a particular program and/or channel, the monitoring module 204 may generate monitoring data that includes the program identifier and/or channel identifier associated with the particular program and/or channel being displayed. The monitoring module 204 also may include in the monitoring data how long of a time interval the set top box 106 caused display of the particular program and/or channel before the viewer used the user input device 112 to instruct the set top box 106 to cause display of a different program and/or channel. For example, the monitoring module 204 may determine that Program A on Channel R was displayed for fifteen minutes before the user changed the channel. The monitoring module 204 may communicate the monitoring data to the buffer module 208 for storage.

The display module 206 may control display of the content signal and/or various graphical user interfaces at the display device 108. To cause display of the content signal, the display module 206 may receive instructions from the user input device 112, may tune to a particular program and/or channel based on the received instructions, and may cause display of the particular program and/or channel at the display device 108. The display module 206 also may cause display of an on-demand graphical user interface and a channel package graphical user interface at the display device 108, each graphical user interface is discussed below in further detail.

The buffer module 208 may buffer a predefined amount of monitoring data before generating a monitoring message for communication to the server 102. The monitoring message may include the monitoring data, and optionally may include a set top box identifier that uniquely identifies the set top box 106 sending the monitoring message. The set top box identifier may be a number sequence, a letter sequence, a symbol sequence, combinations thereof, and/or other information to uniquely identify the set top box. The buffer module 208 may communicate the monitoring message at predefined intervals (e.g., every minute, every hour, every day), in real-time, every time the viewer uses the user input device 112 to select a different channel and/or program, after the viewer has changed the channel and/or requested to view a certain number of programs, combinations thereof, and/or upon other time intervals or other events relating to changing the channel and/or viewing a different program.

The request module 210 may generate service request messages based on selections made by the viewer using the user input device 112. The display module 206 may cause display of an on-demand graphical user interface to permit the viewer to request a program on-demand, and may cause display of a channel package graphical user interface at the display device 108 to permit the viewer to purchase a channel package and/or one or more channels individually. The viewer may use the user input device 112 to generate a selection message to request to view an on-demand program, to identify a channel package for purchase, and/or to identify a channel for purchase individually. The request module 210 may receive the selection message from the user input device 112, may generate a service request message identifying the selected on-demand program, channel package, and/or channel individually, and may forward the service request message to the communication module 202, which may communicate the service request message to the server 102 via the network 104. The server 102 is discussed in further detail below.

Figure 3:
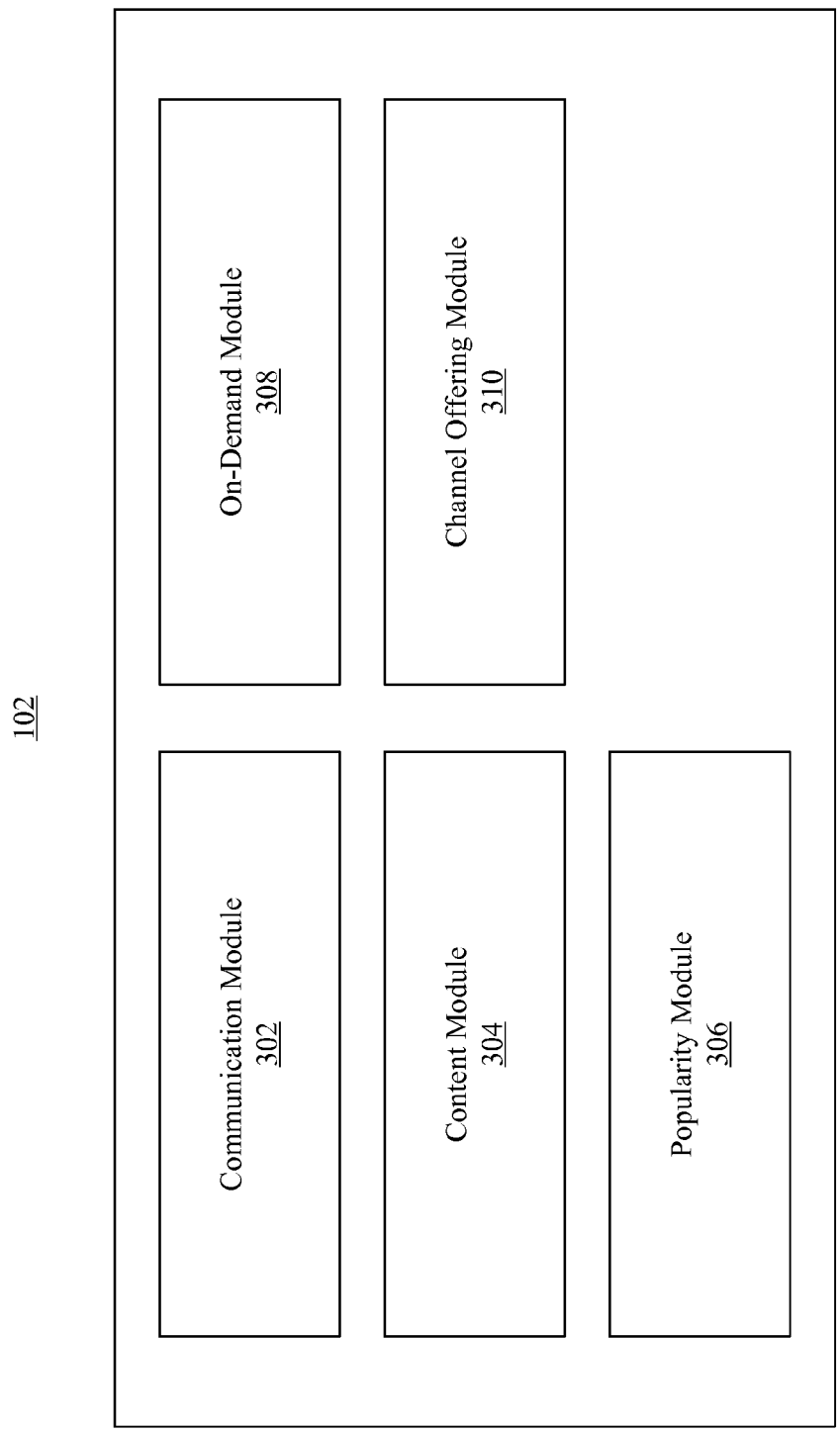
FIG. 3 illustrates various modules of a server in accordance with exemplary embodiments.

FIG. 3 illustrates various modules of the server in accordance with exemplary embodiments. The server 102 may generate and communicate the content signal to the set top box 106 via the network 104. The server 102 also may receive a monitoring message from multiple user premises 110A-N and may aggregate the monitoring data included in the monitoring messages to determine what programs to offer on-demand, to determine which channels to bundle for sale in a channel package, and to determine which channels to offer for sale individually.

In an exemplary embodiment, the server 102 may include a communication module 302, a content module 304, a popularity module 306, an on-demand module 308, and a channel offering module 310. It is noted that the modules 302, 304, 306, 308, and 310 are exemplary. The functions of the modules 302, 304, 306, 308, and 310 may be performed at other modules remote or local to the server 102, and the modules 302, 304, 306, 308, and 310 may be combined and/or separated.

The communication module 302 may communicate content signals from the server 102 to the network 104. The communication module 302 also may communicate messages received from the modules 304, 306, 308, and 310 to the network 104, and may communicate messages to the modules 304, 306, 308, and 310 received from the network 104.

The content module 304 may generate the content signal and may communicate the content signal to the user premises 110. The content module 304 may unicast the content signal to a single set top box 106, may multicast the content signal to a group of set top boxes 106, may broadcast the content signal to the set top boxes 106, and/or combinations thereof.

The popularity module 306 may analyze the monitoring data included in the monitoring message received from some or all of the set top boxes 106. The popularity module 306 may generate channel popularity data and program popularity data based on the monitoring data. The channel popularity may indicate the popularity of a particular channel in aggregate and/or based on demographic information, and the program popularity data may indicate the popularity of a particular program in aggregate and/or based on demographic information, as will be discussed in further detail below.

In an exemplary embodiment, the popularity module 306 may aggregate the monitoring data from the set top boxes 106 to identify which programs and/or which channels are being displayed at the display devices 108. The channel popularity data and program popularity data may be based on an aggregate number, an average number, a number of views weighted average (e.g., multiplying a weighting with a number of viewers of a program/channel), a durational weighted average (e.g., multiplying a weighting based on how long a channel/program is displayed), and/or combinations thereof of set top boxes 106 causing display of a particular program and/or channel at a display device 108 during particular time intervals. In an exemplary embodiment, the popularity module 306 may analyze the monitoring data to determine which programs and/or channels are the most popular (i.e., being displayed by the most number of set top boxes 106). The popularity module 306 may rank the programs and/or channels based on aggregate numbers of set top boxes 106 causing display of each program and/or channel over a particular time period and may include the ranking in the program popularity data and in the channel popularity data. The programs and/or channels being displayed at the highest number of display devices 108 may be considered more popular than programs and/or channels being displayed at fewer display devices 108.

The popularity module 306 also may consider the length of time on which a particular set top box 106 causes display of a particular program and/or channel at the display device 108. The popularity module 306 may use the length of time as a weighting on the channel popularity data and program popularity data. For example, the popularity may apply a scoring system to adjust popularity data based on viewed hours as a duration metric. The popularity module 306 may allot points based on how long a program/channel is displayed. In an exemplary embodiment, the popularity module 306 may give a point for every half hour or more of display, one half point for fifteen minutes or more, but less than a half hour, of display, a quarter point for five minutes or more, but less than fifteen minutes, of display. Any program/channel displayed for less than 5 minutes isn't considered to remove spurious channel surfing records that might affect overall popularity. The popularity module 306 also may impose that if the same program/channel is displayed for more than a certain amount of time (e.g., six hours), the popularity module 306 may consider the first hour and may ignore any points awarded for the other hours. This may account for the scenario where a viewer has just switched on the television set and gone to sleep, or left on a television set and is not watching the program/channel. It is noted that the above embodiment for allotting points is exemplary, and other allocation systems also may be used.

The popularity module 306 also may consider popularity based on demographic information. In an exemplary embodiment, to obtain the demographic information, the set top boxes 106 may cause display of a demographic graphical user interface prompting the viewers for demographic information. Demographic information may include information, such as, but not limited to, age information (e.g., between 18-24, 25-34, etc.), ethnicity information (e.g., Caucasian, Hispanic, etc.), location information (e.g., zip code, city, state, street, neighborhood, county, state, country, etc.), interest information (e.g., sports, history, news, etc.), or other information to segment the viewers into different groups. The demographic information may permit segmentation of the channel popularity data and the program popularity data to rank programs and/or channels according to a popularity for different demographic groups. For example, the popularity module 306 may use the demographic information to rank the most watched programs for similarly situated viewers, such as, but not limited to, viewers who have identified themselves as being in the age group of eighteen to twenty-four. It is noted that the demographic information may be obtained in other ways, such as, but not limited to, when a viewer signs up for and/or updates an account.

The popularity module 306 also may generate trend data. The trend data may identify changes in the popularity data from a current time interval as compared with a previous time interval. For example, the trend data may identify a percentage change in aggregate number of set top boxes 106 causing display of a television program during a current week as compared with an aggregate number of set top boxes 106 causing display of a television program during a previous week.

The on-demand module 308 may receive the program popularity data, and optionally the demographic information and the trend data from the popularity module 306, for use in updating the programs included in an on-demand lineup. In an exemplary embodiment, the on-demand module 308 may use the program popularity data to determine which programs to make available on-demand to the set top boxes 106. The on-demand module 308 may identify a predetermined number of the most popular programs within a given time interval, and may include the predetermined number of the most popular programs in an on-demand lineup. The on-demand lineup may be the programs that the server 102 makes available for viewing on-demand. The viewer may request that the server 102 communicate a content signal including the on-demand program at a time of the viewer's choosing, as is well known.

In an exemplary embodiment, the on-demand module 308 may identify the thirty most popular television programs (or some other number) during the past twenty four hours (or other time intervals, e.g., hours, days, weeks, etc.) based on the program popularity data, and may use those thirty programs as the on-demand lineup and/or may add those thirty programs to the on-demand lineup. The on-demand module 308 also may include a predetermined number of the most popular programs and the programs having the largest gain in popularity from a previous time period, as evidenced by analysis of the trend data.

Once the on-demand lineup has been created, the on-demand module 308 may generate an on-demand lineup message to inform the set top boxes 106 of the updated on-demand lineup. In an exemplary embodiment, the on-demand module 308 may communicate the on-demand lineup message to the one or more of the set top boxes 106 in real-time, at predefined intervals (e.g., every second, minute, hour, day, week, etc.), or in response to receiving a request for the on-demand lineup message from one or more of the set top boxes 106. The set top boxes 106 may use the on-demand lineup to display the programs that are available on-demand from the server 102 in an on-demand graphical user interface. In an exemplary embodiment, the on-demand lineup may be associated with the program identifier for each of the predetermined number of most popular programs during the time interval. The channel offering module 310 may be used to provide demand based offering of channels for sale either individually or bundled together as a channel package.

In an exemplary embodiment, the channel offering module 310 may receive the channel popularity data from the popularity module 306 to determine which channels to offer bundled together for sale as a channel package and/or to determine which channels to offer for sale for individual purchase by the viewers. In other embodiments, marketing professionals may provide the channel offering module 310 with the channel popularity data to manually decide what channels to include in a channel packages (e.g., national or regional channel packages). Because changing the channel package may affect a group of users, either nationally or regionally, and changing the channel package may occur infrequently (e.g., if such a change involves contracts negotiations with content providers etc), changing the channel package may initially be done manually by a management team. The changes to the channel packages also may occur in an automated manner once initially set by a manual process. For example, once changes to the channel packages have been done manually, the channel offering module 310 may implement any channel package change based on channel popularity data obtained based on the monitoring data received from the set top boxes 106. Updating of the channel packages also may occur in a completely automated manner, as described in further detail below.

The channel offering module 310 may examine the channel popularity data to identify a predetermined number of the most popular channels within a given time interval. For example, the channel offering module 310 may identify the thirty most popular television channels (or other number of channels) during the past twenty four hours (or other time intervals, e.g., hours, days, weeks, etc.), and may include those thirty channels in a bundle of channels sold together as a channel package (e.g., basic cable, extended basic cable, premium package, etc.)

The channel offering module 310 also may permit the viewer to individually purchase the channels not included in the channel package. For example, a viewer may have interest in watching a soccer channel, but the soccer channel may not be included in the channel package. The channel offering module 310 may permit the viewer to individually purchase the soccer channel.

The channel offering module 310 optionally may create one or more multiple channel packages based on demographic information. For example, the channel offering module 310 may examine the channel popularity data to identify the channels most popular to sports fans, and may include the most popular channels in a sports channel package. In another example, the channel offering module 310 may create a channel package directed to individuals in the age group between eighteen and thirty, and may include the channels most popular to this demographic group in an "eighteen to thirty" channel package. Other examples include identifying the most popular channels based on geographic region, ethnicity, or other types of demographic information, and creating one or more channel packages including the channels of interest to these different demographic groups.

The channel offering module 310 additionally may analyze trend data when creating a channel package. In an exemplary embodiment, the channel offering module 310 may include a predetermined number of the most popular channels in a channel package, and also may include one or more of the channels that have the highest increase in popularity as compared with a previous time interval. For example, the channel offering module 310 may include the thirty most popular channels in the channel package, and the five channels that showed the biggest gain in the number of set top boxes 106 causing display of those five channels during the past month.

After determining which channels to include in the channel package(s) and/or which channels to offer for sale individually, the channel offering module 310 may create a package message. The package message may include channel identifiers for the channels included in the one or more channel packages, and may include the channel identifiers for the channels offered for sale individually. The server 102 may communicate the package message to the set top box 106 to cause display of the contents of the package message at the display device 108. The set top box 106 may cause display of the contents of the package message in a channel package graphical user interface to permit the viewer to select to purchase the channel package and optionally any of the channels offered individually. The channel package graphical user interface will be discussed in further detail below with reference to FIG. 5.

Figure 4:
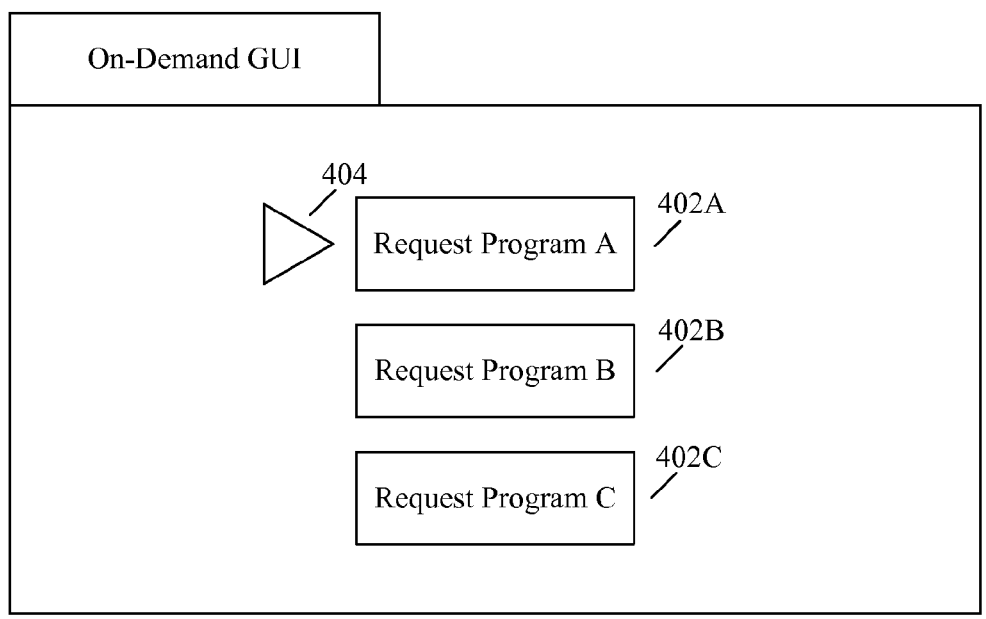
FIG. 4 illustrates an on-demand graphical user interface in accordance with exemplary embodiments.

FIG. 4 illustrates an on-demand graphical user interface in accordance with exemplary embodiments. The on-demand graphical user interface 400 may permit the viewer to instruct the set top box 106 to retrieve an on-demand program for display at the display device 108. An on-demand program may generally refer to a program communicated by the server 102 to the set top box 106 at a time of the viewer's choosing. Technologies for delivering programs on-demand are well-known.

In an exemplary embodiment, the on-demand graphical user interface may be displayed in response to a viewer request to view the on-demand graphical user interface 400. For example, the viewer may use the user input device 112 to generate an on-demand display request that requests the set top box 106 to cause display of the on-demand graphical user interface 400 at the display device 108. When the on-demand display request is received, the display module 206 of the set top box 106 may examine the on-demand lineup data received in the on-demand lineup message from the server 102 to generate the on-demand graphical user interface 400.

In an exemplary embodiment, the display module 206 may identify the program identifier for each program included in the on-demand lineup message, and may associate the program identifier with one or more program request fields 402. The display module 206 may cause the display of the program request fields 402 in the on-demand graphical user interface 400. In the exemplary embodiment depicted in FIG. 4, the on-demand graphical user interface 400 includes three program request fields 402A-C, with program request field 402A including the text "Request Program A," with program request field 402B including the text "Request Program B," and with program request field 402C including the text "Request Program C." It is noted that the number of program request fields 402 included in the on-demand graphical user interface 400 may vary.

The viewer may use the user input device 112 to select one of the program request fields 402. In an exemplary embodiment, the on-demand graphical user interface may include an indicator 404 to identify which program request field 402 is selected, and the viewer may press an input key on the user input device 112 to generate a select message requesting that the set top box 106 retrieve the selected program associated with the program request field 402. Upon receipt of the select message at the set top box 102, the request module 210 may generate an on-demand request message and may communicate the on-demand request message to the server 102 via the network 104. The on-demand request message may include the program identifier associated with the selected program request field 402. The server 102 may receive the on-demand request message, may retrieve the program associated with the program identifier, and may communicate a content signal including the program to the set top box 102 via the network 104. As the content signal is being received, the display module 206 may cause display of the content signal at the display device 108 to display the selected program to the viewer. In addition to providing programs on-demand, the set top box 106 may present the viewer with a channel package graphical user interface, described below.

Figure 5:
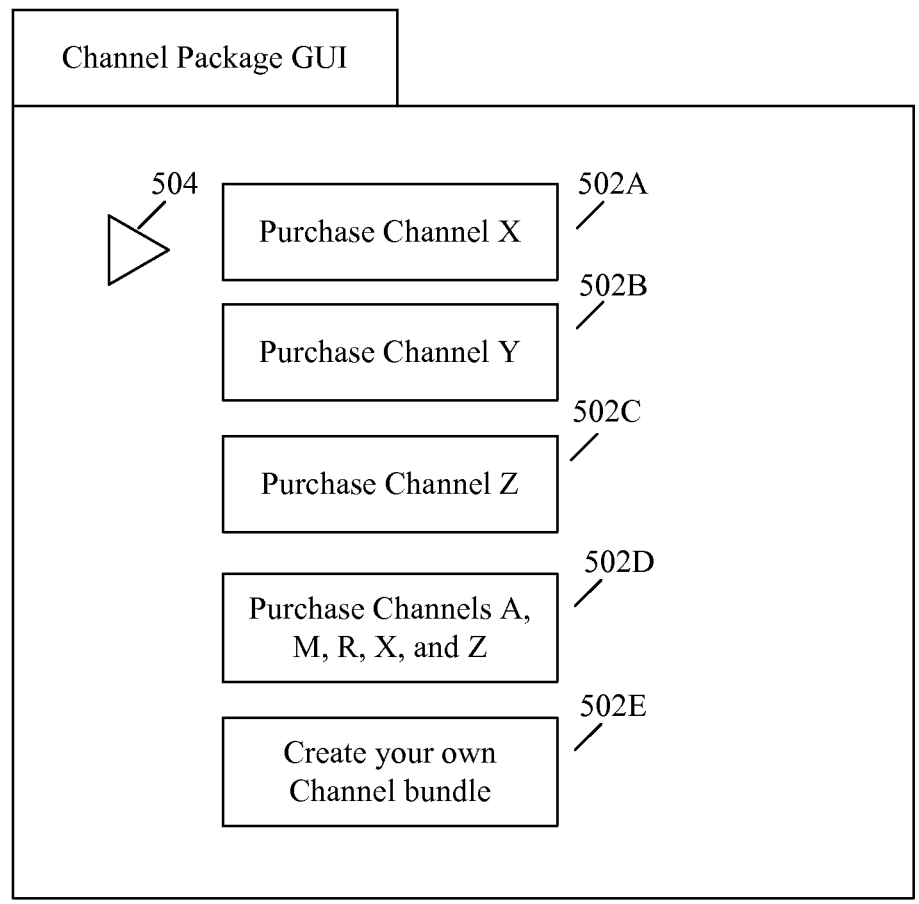
FIG. 5 illustrates a channel package graphical user interface in accordance with exemplary embodiments.

FIG. 5 illustrates a channel package graphical user interface in accordance with exemplary embodiments. The channel package graphical user interface 500 may permit the viewer to purchase channel packages and/or to purchase channels individually that are not included in channel packages presented to the viewer. In an exemplary embodiment, the channel package graphical user interface 500 may be displayed in response to a viewer request to view the channel package graphical user interface 500. For example, the viewer may use a user input device 112 to generate a channel package display request that requests the set top box 106 to cause the display of the channel package graphical user interface 500 at the display device 108. When the channel package display request is received, the display module 206 of the set top box 106 may examine the package message received from the server 102 to generate the channel package graphical user interface 500.

In an exemplary embodiment, the display module 206 may identify the channel identifier for each channel included in the package message and may identify the channel identifier for each channel offered individually. The display module 206 may associate the channel identifier with channel request fields 502 displayed in the channel package graphical user interface 500. In the exemplary embodiment depicted in FIG. 5, the channel package graphical user interface 500 includes five channel request fields 502A-E, with channel request field 502A including the text "Purchase Channel X," with channel request field 502B including the text "Purchase Channel B," with channel request field 502C including the text "Purchase Channel C," with channel request field 502D including the text "Purchase Channels A, M, R, X, and Z," and with channel request field 502E including the text "Create your own Channel Bundle." It is noted that the number of channel request fields 502 included in the channel package graphical user interface 500 may vary.

The viewer may use the user input device 112 to select one of the channel request fields 502. In an exemplary embodiment, the channel package graphical user interface 500 may include an indicator 504 to identify which channel request field 502 is selected, and the viewer may press an input key on the user input device 112 to generate a purchase message instructing the set top box 106 to purchase the selected channel or channel package associated with the channel request field 502. For example, the viewer may select the channel request field 502A to purchase channel X. In another example, the viewer may select the channel request field 502D to purchase the channel package including channels A, M, R, X, and Z. In a further example, the viewer may select the channel request field 502E to create their own bundle of channels, where the viewer may, for example, select to purchase the channel package of channels from the channel request field 502D and channel X of the channel request field 502A.

Upon receipt of the purchase message at the set top box 106, the request module 210 may generate a channel purchase request message and may communicate the channel purchase request message to the server 102 via the network 104. The channel purchase request message may include the one or more channel identifiers associated with the selected one or more channel request fields 502. The server 102 may receive the channel purchase request message and may update the viewer's account to include the purchased channels.

Once purchased, the server 102 may communicate the newly purchased channels in a variety of ways to the set top box 106. For example, the server 102 may update the content signal to include the newly purchased channels. In another example, the server 102 may communicate a decryption key and/or a descrambling code to the set top box 106 for use in decrypting and/or descrambling the content signal to permit the set top box 106 to cause display of the newly purchased channels. In other examples, the set top box 106 may cause the display device 108 to display a graphical user interface to prompt the viewer with a message to do a soft or hard reset of the set top box 106, so the channel changes can take effect. The set top box 106 may boot up and automatically get the latest channel map information for that user, where the channel map information may identify the channels the viewer has purchased and the set top box 106 is permitted to cause display. As the content signal is being received, upon receiving instructions from the viewer using the user input device 112, the set top box 106 may cause display of the newly purchased channel from the content signal at the display device 108 to display the newly purchased channel to the viewer.

It is noted that the above description describes the set top box 106 causing display of the channel package graphical user interface and the on-demand graphical user interface at the display device 108. The channel package graphical user interface 500 and the on-demand graphical user interface 400 may be presented at a computer, mobile phone, or other device capable of presenting a graphical user interface local or remote to the user premises 110. The channel package graphical user interface 500 may be used to purchase channel packages and/or the on-demand graphical user interface 400 request video on-demand at one location for display at another local or remote location. For example, a viewer may use their computer at work to access the channel package graphical user interface 500 to purchase a channel package for their home. In another example, a parent may use their mobile phone to access the on-demand graphical user interface 400, to select a program for on-demand delivery to their home set top box 106 for viewing by their children.

Figure 6:
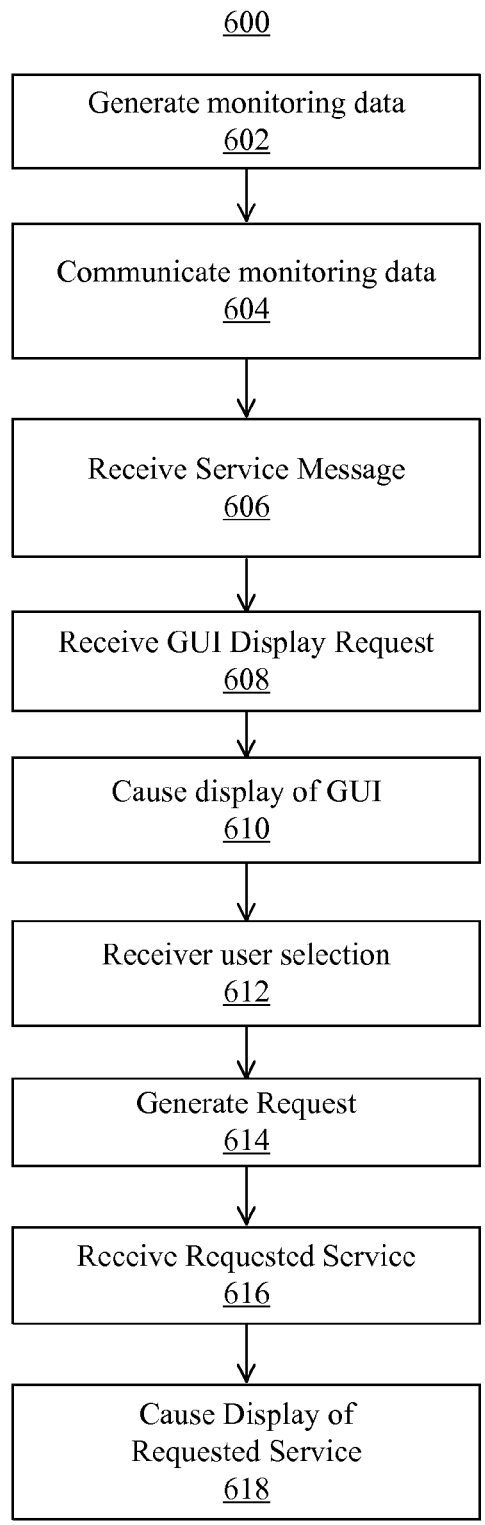
FIG. 6 illustrates a method for monitoring channels and programs viewed to permit demand based offering of on-demand programming and channel packages in accordance with exemplary embodiments.

FIG. 6 illustrates a method for monitoring displayed channels and programs to permit demand based offering of on-demand programming and channel packages in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method may include generating monitoring data at set top box. In an exemplary embodiment, the monitoring module 204 may monitor the channels, programs, and the duration of display of the channels and programs of which the display module 206 is causing to be displayed at the display device 108. The monitoring module 204 may identify and may communicate one or more channel identifiers, one or more program identification identifiers, time duration information, and/or combinations thereof to the buffer module 208 for storage as monitoring data. The method 600 may continue to block 604.

In block 604, the method 600 may include communicating a monitoring message based on the monitoring data to the server 102. In an exemplary embodiment, the buffer module 208 may receive a predetermined amount of monitoring data from the monitoring module 204, and may generate a monitoring message including the monitoring data. The buffer module 208 may generate the monitoring message in real time or a certain number of times during a time interval. For example, the buffer module 208 may generate the monitoring message once per minute, hour, day, etc. The buffer module 208 may communicate the monitoring message to the communication module 202 for communication to the server 102 via the network 104. The method 600 may continue to block 606.

In block 606, the method may include receiving a service message. In an exemplary embodiment, the server 102 may communicate the service message to the set top box 106 via the network 104. The service message may be the on-demand lineup message or the package message, as described above. The set top box 106 may use data included in the service message to display the programs available on-demand in the on-demand graphical user interface 400 and/or to display one or more channel packages and/or channels available for individually purchase via the channel package graphical user interface 500. The method 600 may continue to block 608.

In block 608, the method may include receiving a graphical user interface display request. In an exemplary embodiment, the viewer may use the user input device 112 to generate a graphical user interface display request that requests that the set top box 106 cause the display device 108 to display a graphical user interface. The graphical user interface may be the on-demand graphical user interface 400 or the channel package graphical user interface 500, as described above. The method 600 may continue to block 610.

In block 610, the method may include causing the display of a graphical user interface. In an exemplary embodiment, in response to the graphical user interface display request, the display module 206 may cause display of a graphical user interface at the display device 108. The method 600 may continue to block 612.

In block 612, the method may include receiving a user selection of a field included in the graphical user interface. In an exemplary embodiment, the set top box may receive a selection of a program request field 402 presented in the on-demand graphical user interface 400. Also, the set top box 106 may receive a selection of a channel request field 502 of the channel package graphical user interface 500. The method 600 may continue to block 614.

In block 614, the method may include generating and communicating a service request message to the server based on the selected field. In an exemplary embodiment, the set top box 106 may communicate an on-demand request message to the server 102 for requesting a particular on-demand program. Also, the set top box 106 may communicate a channel purchase request message to the server 102 to request to purchase one or more channels and/or one or more channel packages. The method 600 may continue to block 616.

In block 616, the method may include receiving the requested service. In an exemplary embodiment, the server 102 may receive the on-demand request message and may communicate a content signal including the requested on-demand program. In an exemplary embodiment, the server 102 may receive the channel purchase request message and may communicate a content signal including the requested channel and/or a code to decrypt and/or descramble the one or more channels in the content signal. The method 600 may continue to block 618.

In block 618, the method may include causing display of the requested service. In an exemplary embodiment, the set top box 106 may receive and may cause display of the received content signal at the display device 108. Also, the set top box 106 may receive a key or other decryption information to decrypt/descramble channels included in a channel package and/or one or more individually purchased channels and may cause display of the ordered one or more channels at the display device 108. The method 600 may then end.

Figure 7:
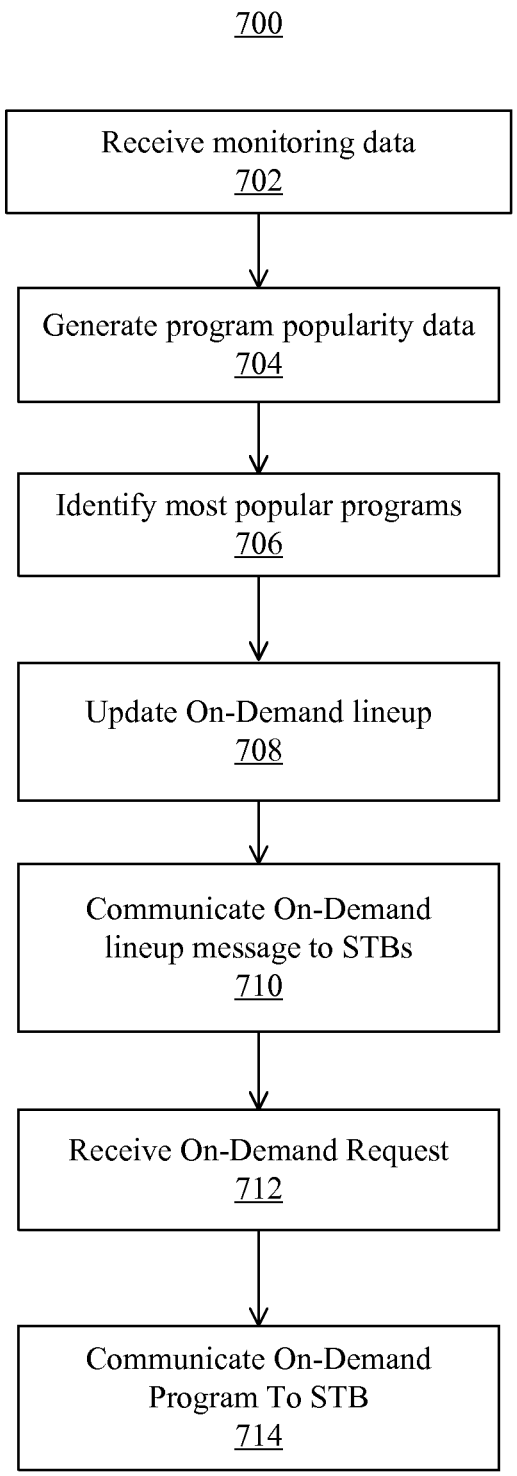
FIG. 7 illustrates a method for offering demand based on-demand programming in accordance with exemplary embodiments.

FIG. 7 illustrates a method for offering demand based on-demand programming in accordance with exemplary embodiments. This exemplary method is provided by way of example, as there are a variety of ways to carry out methods disclosed herein. The method 700 shown in FIG. 7 can be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method may include receiving a monitoring message from one or more set top boxes. In an exemplary embodiment, the server 102 may receive a monitoring message from one or more set top boxes 106. The method 700 may continue to block 704.

In block 704, the method may include generating program popularity data based on the monitoring messages received from the multiple set top boxes 106. In an exemplary embodiment, the popularity module 306 may analyze the monitoring data to determine which programs are the most popular. The popularity module 306 may rank the programs based on aggregate numbers of set top boxes 106 causing display of each program over a particular time period and may include the ranking in the program popularity data. The rankings also may be based on demographic information. The method 700 may continue to block 706.

In block 706, the method may include identifying a predetermined number of the most popular programs based on the program popularity data. In an exemplary embodiment, the on-demand module 308 may examine the program popularity data to determine a predetermined number of the most popular programs. For example, the on-demand module 308 may identify the twenty most popular programs in the program popularity data. The predetermined number of the most popular programs also may be based on trend data indicating increases in popularity of the programs in relation to a previous time interval. The method 700 may continue to block 708.

In block 708, the method may include updating the on-demand lineup based on the identified most popular programs. In an exemplary embodiment, the on-demand module 308 may include updating the on-demand lineup based on the identified most popular programs. The on-demand module 308 may include the program identification information for the identified most popular program messages in an on-demand lineup message. The method 700 may continue to block 710.

In block 710, the method may include communicating the on-demand lineup message to one or more set top boxes. In an exemplary embodiment, the server 102 may communicate the on-demand lineup message to each of the set top boxes 106A-N. The set top boxes 106 may display information (e.g., text, pictures, video, audio, etc.) associated with the programs included in the on-demand lineup message in the program request fields 402 of the on-demand graphical user interface 400. The method 700 may continue to block 712.

In block 712, the method may include receiving an on-demand request message from the set top box. In an exemplary embodiment, the on-demand module 308 may receive an on-demand request message from the set top box 106 via the network 104. The on-demand request message may include a program identifier from the on-demand lineup message to identify an on-demand program. The method 700 may continue to block 714.

In block 714, the method may include communicating the requested on-demand program to the set top box. In an exemplary embodiment, the on-demand module 308 may identify an on-demand program associated with the on-demand program identifier, and may communicate a content signal including the program to the set top box 106 via the network 104 on-demand. The method 700 may then end.

Figure 8:
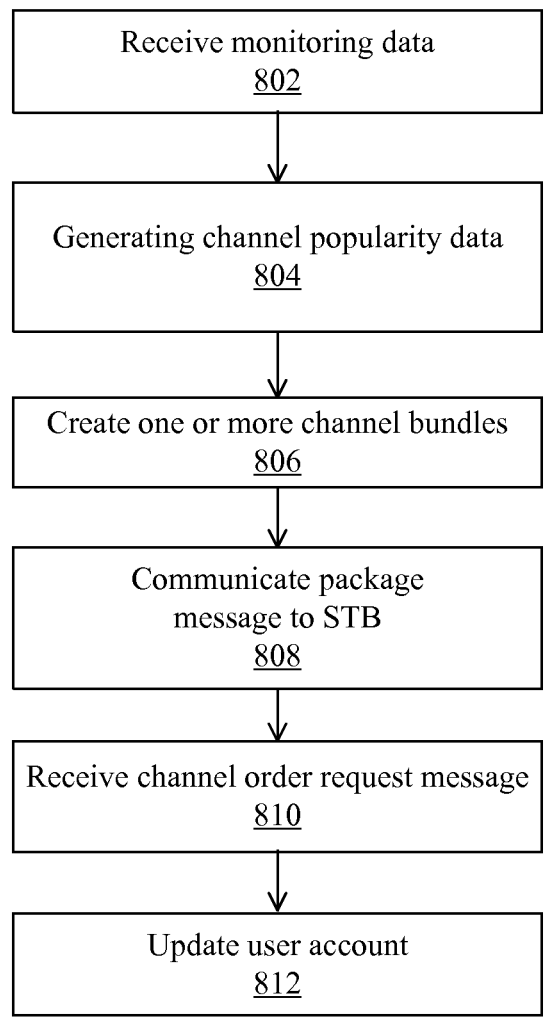
FIG. 8 illustrates a method for offering demand based channel packages to a viewer in accordance with exemplary embodiments.

FIG. 8 illustrates a method for offering demand based channel packages to a viewer in accordance with exemplary embodiments. This exemplary method is provided by way of example, as there are a variety of ways to carry out methods disclosed herein. The method 800 shown in FIG. 8 can be executed or otherwise performed by one or a combination of various systems. The method 800 is described below as carried out by the system 100 shown in FIG. 1 by way of example, and various elements of the system 100 are referenced in explaining the example method of FIG. 8. Each block shown in FIG. 8 represents one or more processes, methods, or subroutines carried in the exemplary method 800. Referring to FIG. 8, the exemplary method 800 may begin at block 802.

In block 802, the method may include receiving a monitoring message from one or more set top boxes. In an exemplary embodiment, the popularity module 306 of the server 102 may receive monitoring data from some or all of the set top boxes 106A to 106N. The method 800 may continue to block 804.

In block 804, the method may include generating channel popularity data based on the monitoring messages. In an exemplary embodiment, the popularity module 306 may analyze the monitoring data to determine which channels most of the set top boxes 106 are causing display during one or more time intervals. The popularity module 306 may rank the programs based on aggregate numbers of set top boxes 106 causing display of each channel over a particular time period and may include the ranking in the program popularity data. The popularity module 306 also may include in the channel popularity data rankings of the most popular channels based on different types of demographic information. The demographic information may be based on a viewer profile included in the monitoring message, may be based on information obtained when in a viewer applied for and/or updated an account, or based on other demographic information obtained from the viewer. The method 800 may continue to block 806.

In block 806, the method may include creating one or more channel packages. In an exemplary embodiment, the channel offering module 310 may determine which channels to bundle together and offer as a channel package, and which channels to offer individually, based on the popularity of certain channels. The channel packages may be, for example, based on an aggregate popularity, may be based popularity of channels with viewers having certain demographics (e.g., sports, camping, electronics, history, news, etc.), may be based on trend data, and/or may be based on other demographic information. For example, channel packages may be created targeting people of certain ethnicity, background, age, race or other information useable to segment the viewers. The channel packages may be used to target certain channels to certain demographic groups. The method 800 may continue to block 808.

In block 808, the method may include communicating a package message to the set top boxes. In an exemplary embodiment, the channel offering module 310 may generate a package message for communication to one or more of the set top boxes 106A-N. The package message may include one or more channel identifiers for the one or more channel packages, and also may include the channel identifiers for channels available to purchase individually. The method 800 may continue to block 810.

In block 810, the method may include receiving a channel purchase request message from the set top box. In an exemplary embodiment, the channel offering module 310 may receive a channel purchase request message from a set top box 106. The channel purchase request message may include one or more channel identifiers to order a particular channel package and/or to individually order one or more channels. The method 800 may continue to block 812.

In block 812, the method 800 may include updating the viewer account based on the received channel order request message. In an exemplary embodiment, the channel offering module 310 may update the viewer's account to indicate that the viewer has ordered one or more new channel bundles and/or one or more new channels individually. The channel offering module 310 may then begin communicating a content signal including the one or more new channel bundles and/or the one or more new channels to the set top box 106. Also, the channel offering module 310 may communicate a decryption and/or descrambling code to the set top box 106. The set top box 106 may use the decryption and/or descrambling code to decrypt and/or descramble the channel thereby permitting set top box 106 to cause display of the one or more newly purchased channel bundles and/or the one or more new channels at the display device 108. The method 800 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
monitoring content being displayed at a display device to generate monitoring data that includes a program identifier, wherein the monitoring data comprises the amount of time each of one or more programs was displayed;
communicating the monitoring data to a server, the server:
analyzing the monitoring data to generate popularity data, the popularity data being based on a number of devices causing display of each program and the amount of time each program was displayed by each device causing display of the respective program,
analyzing the monitoring data to generate trend data that identifies a percentage change in an aggregate number of devices causing display of each program as compared with a previous time period,
determining which programs to include in an on-demand lineup based on the monitoring data, and
generating an on-demand lineup message to identify on-demand programs included in the on-demand lineup, wherein the on-demand lineup message further identifies on-demand programs based on the trend data; and
receiving the on-demand lineup message from the server.

2. The method of claim 1, further comprising causing display of an on-demand graphical user interface that includes a program field associated with at least one of the on-demand programs.

3. The method of claim 1, further comprising receiving a selection message selecting the program field, the program field being associated with an on-demand program identifier.

4. The method of claim 3, further comprising communicating an on-demand request message to the server, the on-demand request message including the on-demand program identifier.

5. The method of claim 4, further comprising receiving a content signal including the on-demand program associated with the on-demand program identifier from the server.

6. The method of claim 5, further comprising causing display of the selected on-demand program at the display device.

7. A non-transitory computer readable media comprising code to perform the acts of the method of claim 1.

8. The method of claim 1, wherein at least one of the devices causing display of each program comprises one of a set top box, a wireless device, and a mobile communications device.

9. A method comprising:
receiving a monitoring message from one or more devices, the one or more devices causing display of one or more programs, the monitoring message including monitoring data, wherein the monitoring data for each of the one or more devices comprises the amount of time each of the one or more programs was displayed on the respective device;
analyzing the monitoring data to generate popularity data, the popularity data being based on a number of devices causing display of each program and the amount of time each program was displayed on each device causing display of the respective program;
analyzing the monitoring data to generate trend data that identifies a percentage change in an aggregate number of devices causing display of each program as compared with a previous time period;
updating an on-demand program lineup based on the popularity data;
generating an on-demand program lineup message based on the updated on-demand program lineup, wherein the on-demand lineup message further identifies on-demand programs based on the trend data; and
communicating the on-demand program lineup message to the one or more devices.

10. The method of claim 9, wherein the popularity data is a ranking of each program relative to one another based on an aggregate number of devices causing display of each program.

11. The method of claim 9, wherein analyzing the monitoring data to generate popularity data ranks the number of devices causing display of each program based on demographic information.

12. The method of claim 11, wherein the demographic information comprises at least one of ethnicity information, location information, age information, and viewer interests information.

13. A non-transitory computer readable media comprising code to perform the acts of the method of claim 9.

14. A method comprising:
receiving a monitoring message from one or more devices, the one or more devices causing display of one or more channels, the monitoring message including monitoring data, wherein the monitoring data for each of the one or more devices comprises the amount of time each of the one or more channels was displayed on the respective device;

analyzing the monitoring data to generate popularity data, the popularity data being based on a number of devices causing display of each channel;

analyzing the monitoring data to generate trend data that identifies a percentage change in an aggregate number of devices causing display of each channel as compared with a previous time period;

creating one or more channel packages based on the popularity data, wherein the one or more channel packages further includes channels based on the trend data;

generating a package message, the package message identifying the channel packages and one or more channels available individually; and communicating the package message to the one or more devices.

15. The method of claim 14, wherein the popularity data is a ranking of each channel relative to one another based on an aggregate number of devices causing display of each channel.

16. The method of claim 14, wherein analyzing the monitoring data to generate popularity data ranks the number of devices causing display of each channel based on demographic information.

17. The method of claim 16, wherein the demographic information comprises at least one of ethnicity information, geographic information, age information, and viewer interests information.

18. The method of claim 14, wherein the popularity data is based on trend data that identifies a change in an aggregate number of devices causing display of each channel as compared with an aggregate number of devices causing display of each channel in a previous time period.

19. A non-transitory computer readable media comprising code to perform the acts of the method of claim 14.

20. A system comprising:
a processor configured to execute one or more modules;
a monitoring module to monitor content being displayed at a display device to generate monitoring data, the monitoring data including a program identifier, wherein the monitoring data comprises the amount of time each of one or more programs was displayed; and
a communication module to communicate the monitoring data to a server and to receive an updated on-demand lineup message from the server, the updated on-demand lineup message identifying on-demand programs included in the on-demand lineup, wherein the server:
analyzes the monitoring data to generate popularity data, the popularity data being based on a number of devices causing display of each program and the amount of time each program was displayed by each device causing display of the respective program,
analyzes the monitoring data to generate trend data that identifies a percentage change in an aggregate number of devices causing display of each program as compared with a previous time period,
determines which programs to include in an on-demand lineup based on the monitoring data, and
generates an on-demand lineup message to identify on-demand programs included in the on-demand lineup, wherein the on-demand lineup message further identifies on-demand programs based on the trend data.

21. The system of claim 20, wherein at least one of the devices causing display of each program comprises one of a set top box, a wireless device, and a mobile communications device.

* * * * *